United States Patent
Adachi

(10) Patent No.: US 10,303,249 B2
(45) Date of Patent: May 28, 2019

(54) ELECTRONIC APPARATUS EQUIPPED WITH EYE SENSOR HOLDING STRUCTURE AND IMAGE PICKUP APPARATUS EQUIPPED WITH ELECTRONIC APPARATUS

(71) Applicant: CANON KABUSHIKI KAISHA, Tokyo (JP)

(72) Inventor: Keisuke Adachi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 15/819,154

(22) Filed: Nov. 21, 2017

(65) Prior Publication Data

US 2018/0164881 A1    Jun. 14, 2018

(30) Foreign Application Priority Data

Dec. 14, 2016   (JP) .................................. 2016-242105

(51) Int. Cl.
| | |
|---|---|
| H04N 5/225 | (2006.01) |
| G06F 3/01 | (2006.01) |
| G01J 1/02 | (2006.01) |
| H04N 5/232 | (2006.01) |
| G01J 1/04 | (2006.01) |
| G03B 17/00 | (2006.01) |
| G03B 17/02 | (2006.01) |

(52) U.S. Cl.
CPC ................ *G06F 3/013* (2013.01); *G01J 1/02* (2013.01); *G01J 1/0271* (2013.01); *G01J 1/04* (2013.01); *G01J 1/0403* (2013.01); *G03B 17/00* (2013.01); *G03B 17/02* (2013.01); *G06F 3/01* (2013.01); *H04N 5/2252* (2013.01); *H04N 5/23293* (2013.01); *G01J 2001/0276* (2013.01)

(58) Field of Classification Search
CPC ............................ H04N 5/23293; G06F 3/013
USPC ......................................................... 348/375
See application file for complete search history.

(56) References Cited

U.S. PATENT DOCUMENTS

2012/0212398 A1*   8/2012   Border ................. G02B 27/017
                                                                 345/8

FOREIGN PATENT DOCUMENTS

JP            2014215341 A      11/2014

* cited by examiner

Primary Examiner — Usman A Khan
(74) Attorney, Agent, or Firm — Rossi, Kimms & McDowell LLP

(57) ABSTRACT

An electronic apparatus equipped with an eye sensor holding structure that is capable of preventing erroneous detection of an eye sensor without increasing the number of members and of improving an appearance without increasing stray light. An eye sensor that detects an eye-contact state is implemented on a circuit board. A protection window is provided so as to cover a front of the eye sensor and is held in a state where the circuit board is positioned thereto. The protection window is fitted and positioned to an exterior member that has an opening through which the protection window is exposed to external appearance. An elastic member generates energization force for pushing the eye sensor so as to be contact with the protection window and for pushing the protection window so as to be contact with the exterior member.

9 Claims, 6 Drawing Sheets

ELECTRONIC APPARATUS EQUIPPED WITH EYE SENSOR HOLDING STRUCTURE AND IMAGE PICKUP APPARATUS EQUIPPED WITH ELECTRONIC APPARATUS

BACKGROUND OF THE INVENTION

Field of the Invention

The present invention relates to an electronic apparatus equipped with an eye sensor holding structure like an electronic view finder mounted on an image pickup apparatus, such as a digital camera, and an image pickup apparatus equipped with the electronic apparatus concerned.

Description of the Related Art

There is a known electronic view finder as an example of an electronic apparatus that uses an eye sensor that is a combination of an infrared light emitting element and a light receiving element. Power of a display unit of the finder (finder display unit) is turned ON to display an image when a user brings a face close to the finder (see Japanese Laid-Open Patent Publication (Kokai) No. 2014-215341 (JP 2014-215341A)).

An eyepiece unit of the finder disclosed is provided with the eye sensor and a protection window that is fixed to an exterior member so as to cover a front of the eye sensor. When the infrared light emitted from the infrared light emitting element is reflected by a part of a user's face and is received by the light receiving element at the time when a user's eye approaches the finder, it is determined as a use state and the power of the finder display unit is turned ON. Moreover, when the light receiving element stops receiving the infrared light, it is determined as a disuse state and the power of the finder display unit is turned OFF.

Incidentally, it is necessary to position the eye sensor and the protection window with sufficient accuracy so that only infrared light reflected by a part of the face is received in order to detect the eye-contact state correctly by the eye sensor that is the combination of the infrared light emitting elements and the light receiving element.

However, the technique described in the above-mentioned publication is difficult to position the protection window and the eye sensor with sufficient accuracy because the protection window and the eye sensor are positioned across a holding member. Accordingly, the infrared light reflected by an inner surface of the protection window etc. may reach the light receiving element of the eye sensor as stray light, which may cause erroneous detection of an eye-contact state even if the eye-contact state is not attained.

Although there is a known configuration that obstructs the stray light by arranging a partition between the infrared light emitting element and the light receiving element, the number of members increases. Furthermore, the protection window is often fixed to the exterior member in order to avoid degradation of an appearance. In such a case, a deviation amount between the eye sensor that is fixed to a member different from the protection window and the protection window becomes large, which increases the stray light.

SUMMARY OF THE INVENTION

The present invention provides an electronic apparatus equipped with an eye sensor holding structure and an image pickup apparatus equipped with the electronic apparatus, which are capable of preventing erroneous detection of an eye sensor without increasing the number of members and of improving an appearance without increasing stray light.

Accordingly, a first aspect of the present invention provides an electronic apparatus equipped with an eye sensor holding structure including a circuit board on which an eye sensor that detects an eye-contact state is implemented, a protection window that is provided so as to cover a front of the eye sensor and that is held in a state where the circuit board is positioned thereto, an exterior member to which the protection window is fitted and positioned and that has an opening through which the protection window is exposed to external appearance, and an elastic member that generates energization force for pushing the eye sensor so as to be contact with the protection window and for pushing the protection window so as to be contact with the exterior member.

Accordingly, a second aspect of the present invention provides an image pickup apparatus including an electronic view finder, an eye sensor that detects an eye-contact state to the electronic view finder, a circuit board on which the eye sensor is implemented, a protection window that is provided so as to cover a front of the eye sensor and that is held in a state where the circuit board is positioned thereto, an exterior member to which the protection window is fitted and positioned and that comprises an opening through which the protection window is exposed to external appearance, and an elastic member that generates energization force for pushing the eye sensor so as to be contact with the protection window and for pushing the protection window so as to be contact with the exterior member.

According to the present invention, the electronic apparatus equipped with the eye sensor holding structure and the image pickup apparatus equipped with the electronic apparatus that are capable of preventing erroneous detection of the eye sensor without increasing the number of members and of improving the appearance without increasing stray light.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1A:
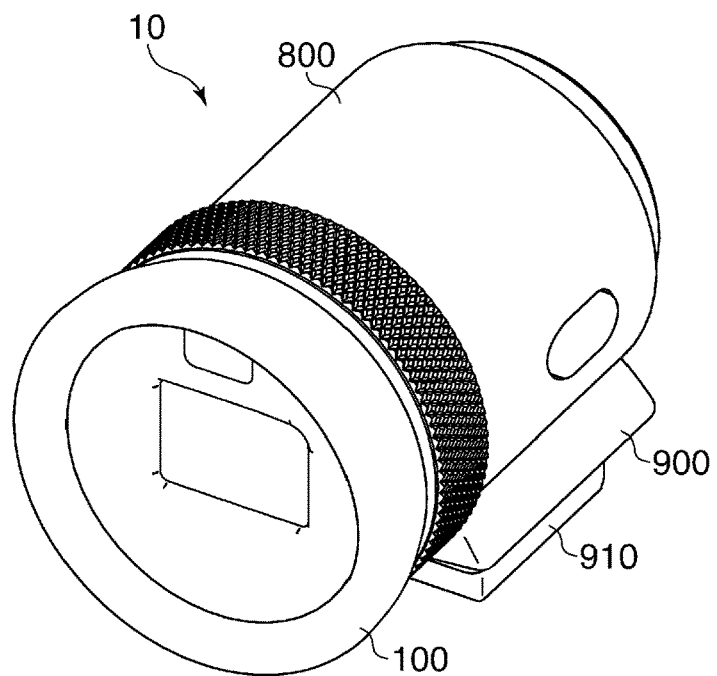
FIG. 1A is a perspective view showing an electronic view finder that is an example of an electronic apparatus equipped with an eye sensor holding structure according to an embodiment of the present invention.
Figure 1B:
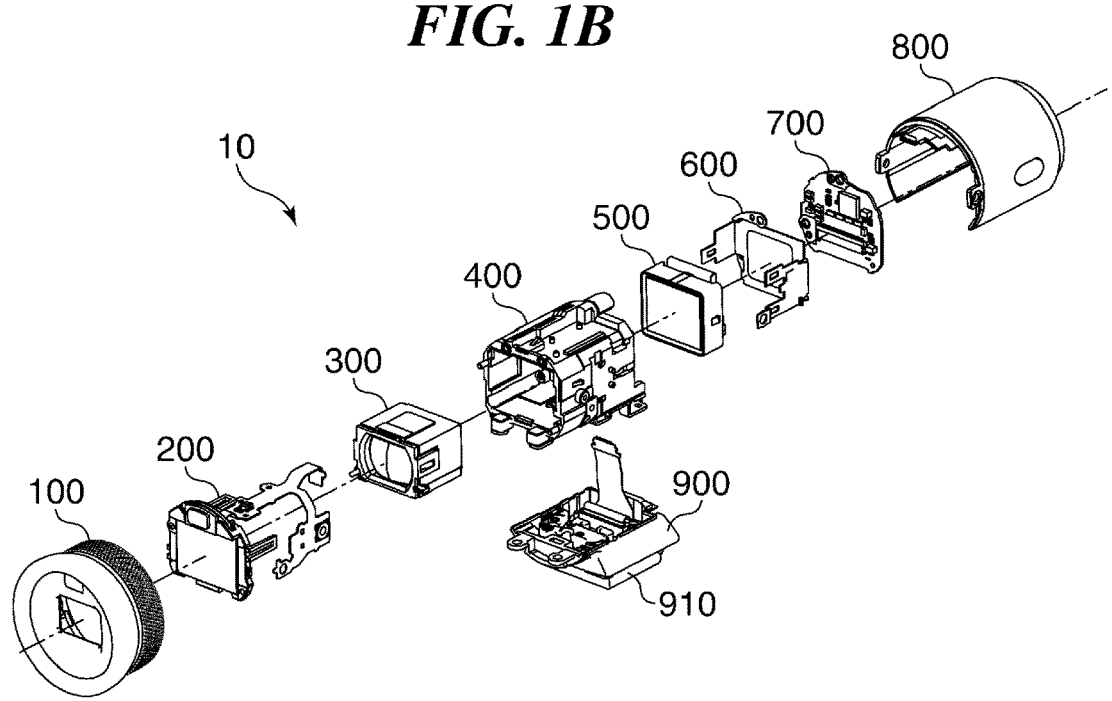
FIG. 1B is an exploded perspective view showing the electronic view finder shown in FIG. 1A.
Figure 2:
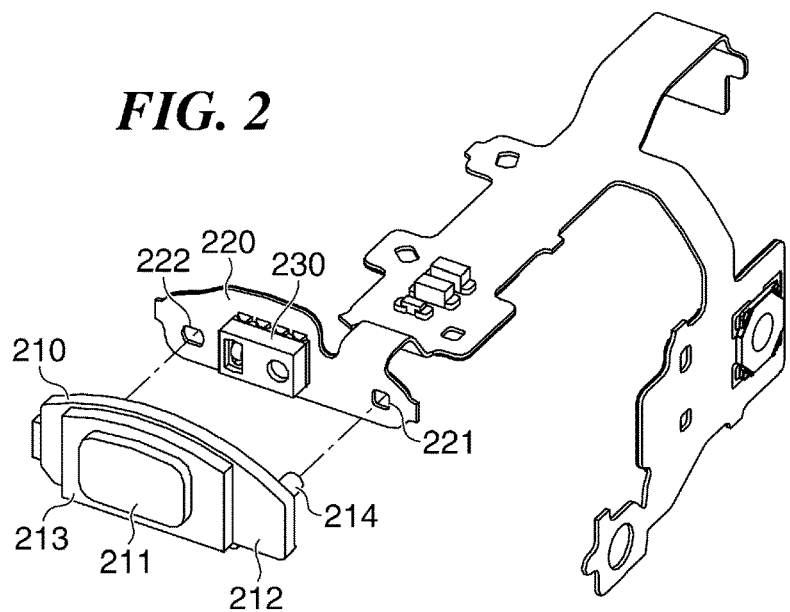
FIG. 2 is an exploded perspective view showing a protection window and a flexible printed circuit board of the electronic view finder shown in FIG. 1A.
Figure 3:
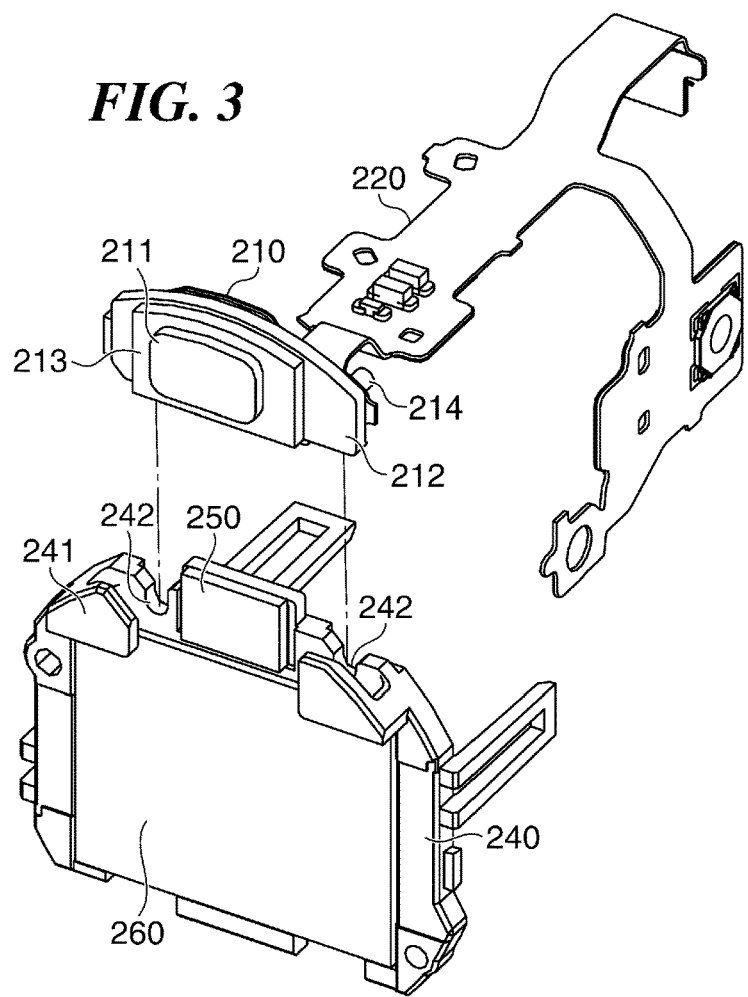
FIG. 3 is an exploded perspective view showing the assembly in FIG. 2 and a cover member.
Figure 4:
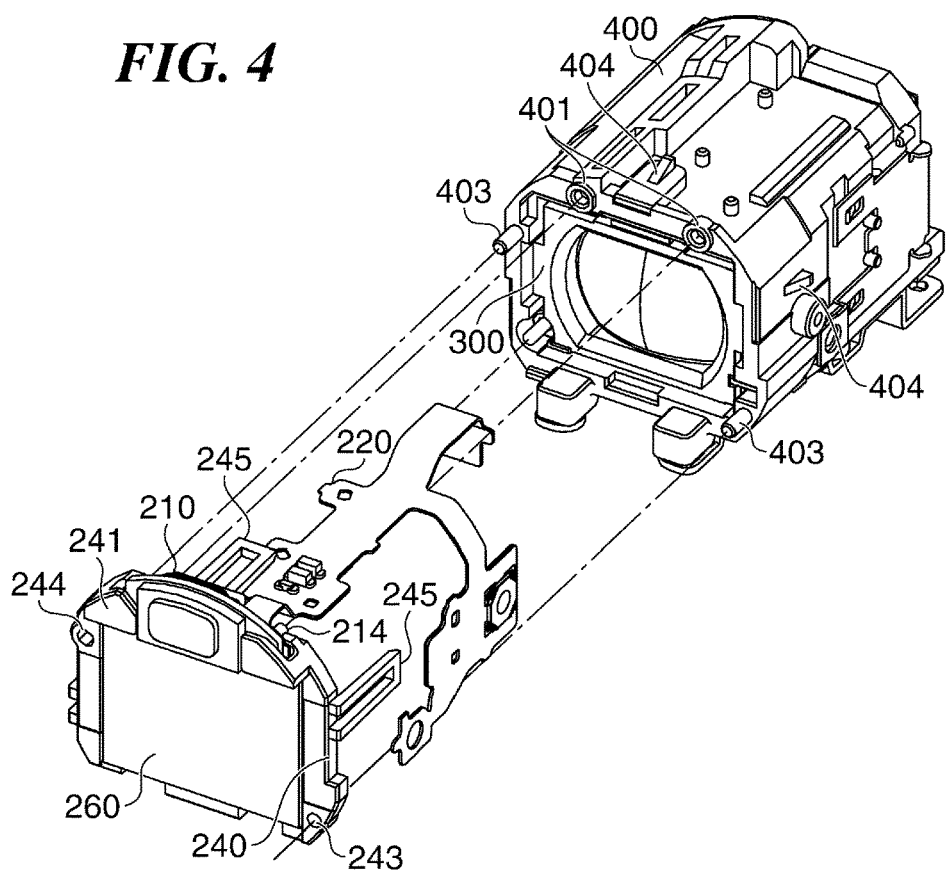
FIG. 4 is an exploded perspective view showing the assembly in FIG. 3 and a base member.
Figure 5:
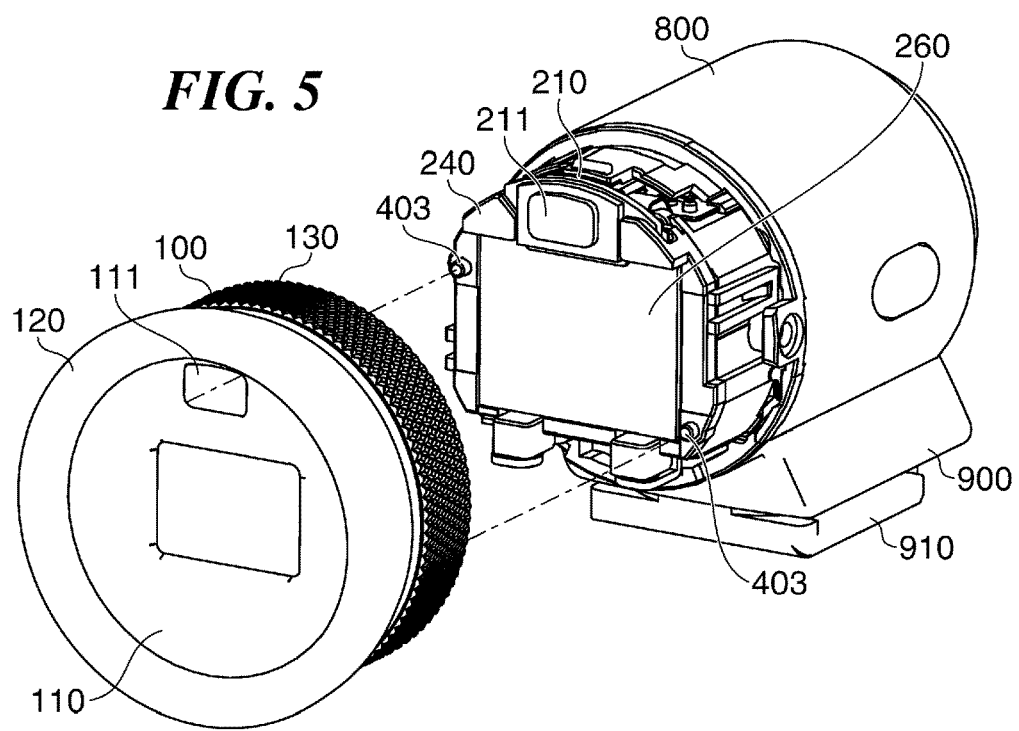
FIG. 5 is an exploded perspective view showing the assembly in FIG. 4 held by the cover member and an eyepiece unit.

FIG. 1A is a perspective view showing an electronic view finder that is an example of an electronic apparatus equipped with an eye sensor holding structure according to an embodiment of the present invention. FIG. 1B is an exploded perspective view showing the electronic view finder shown in FIG. 1A. FIG. 2 is an exploded perspective view showing a protection window and a flexible printed circuit board of the electronic view finder shown in FIG. 1A. FIG. 3 is an exploded perspective view showing the assembly in FIG. 2 and a cover member. FIG. 4 is an exploded perspective view showing the assembly in FIG. 3 and a base member. FIG. 5 is an exploded perspective view showing the assembly in FIG. 4 held by the cover member and an eyepiece unit. It should be noted that this embodiment describes the electronic view finder mounted on an image pickup apparatus, such as a digital camera, as an example of an electronic apparatus equipped with an eye sensor holding structure of the present invention.

As shown in FIG. 1A and FIG. 1B, the electronic view finder 10 according to this embodiment is provided with the eyepiece unit 100, an eye sensor unit 200, a lens unit 300, and the base member 400. Moreover, the electronic view finder 10 is provided with a display panel 500, the cover member 600, a control base 700, a top cover unit 800, and a bottom cover unit 900.

As shown in FIG. 2 and FIG. 3, the eye sensor unit 200 has the protection window 210, an eye sensor 230, a flexible printed circuit board (hereinafter referred to as an FPC) 220 on which the eye sensor 230 is mounted, and the cover member 240 holding a protection plate 260.

The protection window 210 has two positioning shafts 214 that are projected in an optical axis direction toward the eye sensor 230. The positioning shaft 214 is equivalent to an example of a convex part of the present invention. On the other hand, a positioning hole 221 and an anti-vibration hole 222 corresponding to the two positioning shafts 214 of the protection window 210 are formed in the FPC 220. The protection window 210 is arranged so as to cover the front of the eye sensor 230 by inserting the two positioning shafts 214 into the positioning hole 221 and the anti-vibration hole 222.

Figure 6A:
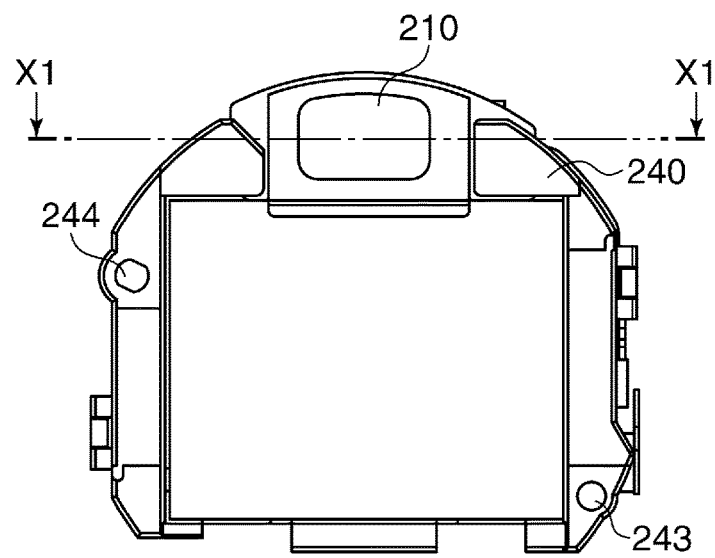
FIG. 6A is a front view showing a configuration after assembling the assembly in FIG. 3 and the cover member.
Figure 6B:
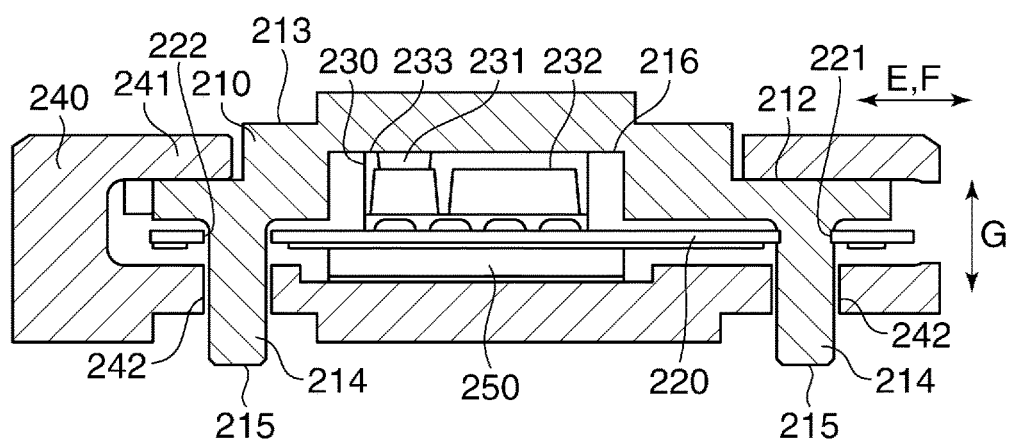
FIG. 6B is a sectional view of the configuration in FIG. 6A taken along the line X1-X1.

As shown in FIG. 6B, the eye sensor 230 has an infrared light emitting element 231 and a light receiving element 232, and detects an eye-contact state by receiving the infrared light reflected by a part of a face when an eye approaches the protection window 210.

The base member 400 holds the lens unit 300 inside thereof so as to be movable in the optical axis direction. The lens unit 300 adjusts diopter by moving the entire lens unit 300 in the optical axis direction. Moreover, the base member 400 holds the display panel 500 inside thereof with the cover member 600 (see FIG. 1B).

The control base 700 controls the eye sensor 230 and the display panel 500. The display panel 500 is constituted by liquid crystal or organic EL etc. and displays a taken image and a reproducing image of a camera when the display panel 500 is attached to the camera. The cover member 600 is made from material with high heat conductivity (cooper, etc.) in order to radiate heat of the display panel 500.

The eyepiece unit 100 has an eyecup 120 that prevents the light from the circumference from entering in the eye-contact state, a diopter adjustment ring 130 that allows a rotary operation, and an eyepiece cover (exterior member) 110 that holds the diopter adjustment ring 130, as shown in FIG. 5. The top cover unit 800 holds the base member 400 inside thereof. The bottom cover unit 900 holds a connector 910 that is electrically connected with a connector (not shown) of the camera side.

Next, the order of assembling of the electronic view finder 10 will be described. First, as shown in FIG. 2, the two positioning shafts 214 of the protection window 210 are fitted into the positioning hole 221 and the anti-vibration hole 222 of the FPC 220. In this embodiment, the positioning hole 221, the anti-vibration hole 222 and the positioning shafts 214 are designed in press fit setting so that the protection window 210 may not fall easily after assembling (see FIG. 6B). Although the positioning shaft 214 is inserted into the anti-vibration hole 222 with a gap in the direction shown in FIG. 6B, the positioning shaft 214 is press fitted to the anti-vibration hole 222 in the direction perpendicular to the sheet of FIG. 6B. Thus, since the FPC 220 to which the eye sensor 230 is implemented is directly positioned to the protection window 210, the protection window 210 and the eye sensor 230 are positioned with sufficient accuracy in directions that intersect perpendicularly with the optical axis.

Next, as shown in FIG. 3, the positioned protection window 210 and the FPC 220 are incorporated in the cover member 240 from an upper side. An elastic member 250 is fixed to the cover member 240. The elastic member 250 is compressed and deformed when the protection window 210 and the FPC 220 are incorporated. Moreover, the cover member 240 includes a contact part 241 that regulates the position of the protection window 210 in the optical axis direction. A first contact part 212 of the protection window 210 is pushed to the contact part 241 by energization force of the elastic member 250. Simultaneously, a contact surface 233 of the eye sensor 230 is pushed to a contact surface 216 of the protection window 210 (see FIG. 6B).

On the other hand, the positioning shafts 214 of the protection window 210 are inserted into regulation grooves 242 of the cover member 240 with a certain gap so as to be movable within a range of this gap. Thereby, the protection window 210 and the FPC 220 are temporarily assembled to the cover member 240, and the eye sensor unit 200 is constituted.

Next, as are shown in FIG. 4, the eye sensor unit 200 is incorporated in the base member 400 so that positioning shafts 403 of the base member 400 are fitted into a positioning hole 243 and an anti-vibration hole 244 that are provided in the cover member 240 of the eye sensor unit 200.

Moreover, when the eye sensor unit 200 is incorporated in the base member 400, three arms 245 provided in the cover member 240 overcome three hooks 404 of the base member 400 while deforming elastically and are latched to the hooks 404. Thereby, the eye sensor unit 200 is fixed to the base member 400. Simultaneously, the positioning shafts 214 provided in the protection window 210 are fitted into two regulation holes 401 provided in the base member 400 with a certain gap (see FIG. 7B). Thereby, the protection window 210 never falls out from the base member 400 and the cover member 240.

Next, as shown in FIG. 5, the eyepiece unit 100 is incorporated in the base member 400 by fitting two positioning shafts 403 provided in the base member 400 into a positioning hole and an anti-vibration hole (not shown) provided in the eyepiece cover 110 of the eyepiece unit 100. At this time, the eyepiece cover 110 is incorporated while pushing a second contact part 213 of the protection window 210 with a contact part 113 (see FIG. 8B). Thereby, the eye sensor 230 and the FPC 220 are pushed in this order, and the elastic member 250 is further compressed and deformed from the temporarily assembled state.

That is, the eye sensor 230 is pushed to the protection window 210 by the energization force of the elastic member 250 that is compressed and deformed, and the position of the eye sensor 230 in the optical axis direction is determined in a state where the protection window 210 is pushed to the eyepiece cover 110. Thus, since the protection window 210 and the eyepiece cover 110 are held in a directly contact state, the protection window 210 and the eye sensor 230 are positioned with sufficient accuracy in the optical axis direction.

Simultaneously, since a fitting part 211 of the protection window 210 is fitted to an inner periphery of an opening 111 provided in the eyepiece cover 110, the positional relationship between the protection window 210 and the eyepiece cover 110 in the directions that intersect perpendicularly with the optical axis is determined. Thus, the eyepiece cover 110 and the protection window 210 are positioned with sufficient accuracy in the directions that intersect perpendicularly with the optical axis and the optical axis direction.

Figure 7A:
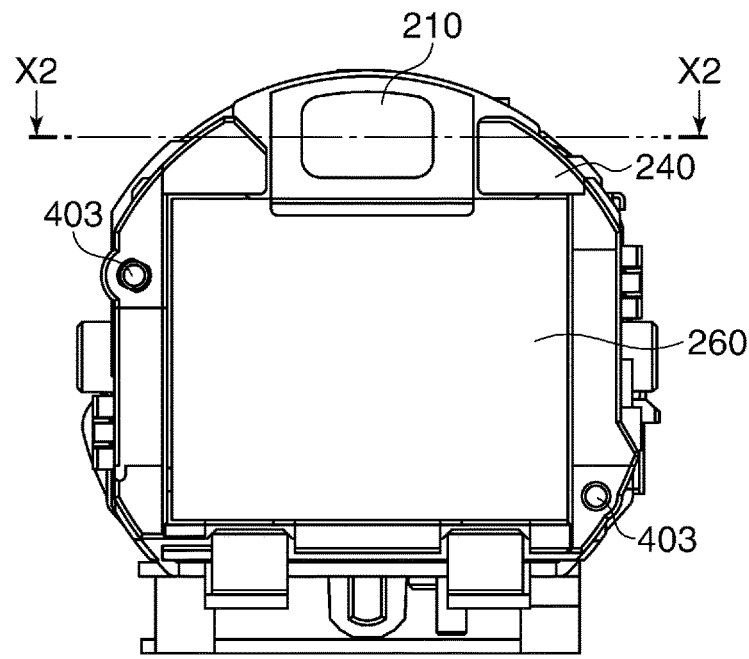
FIG. 7A is a front view showing a configuration after assembling the assembly in FIG. 4 and the base member.
Figure 7B:
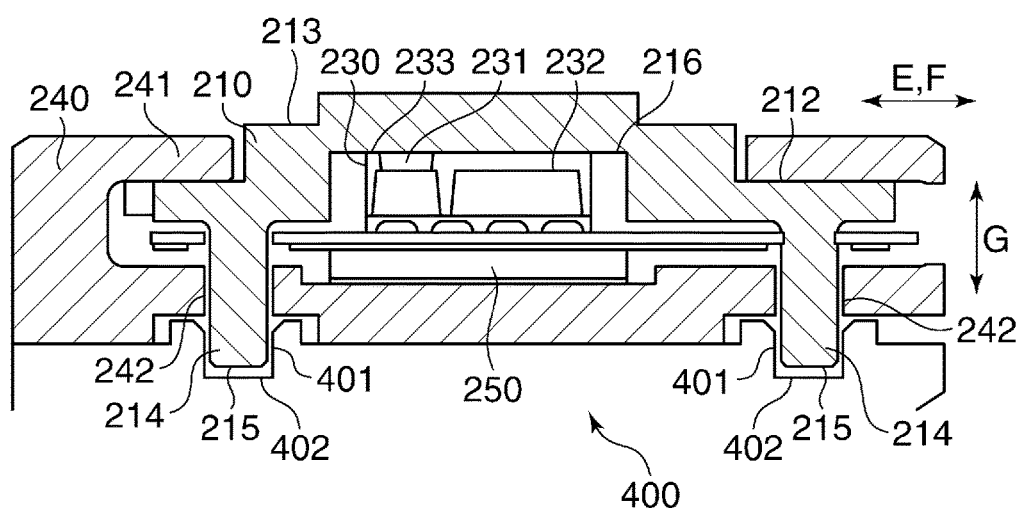
FIG. 7B is a sectional view of the configuration in FIG. 7A taken along the line X2-X2.
Figure 8A:
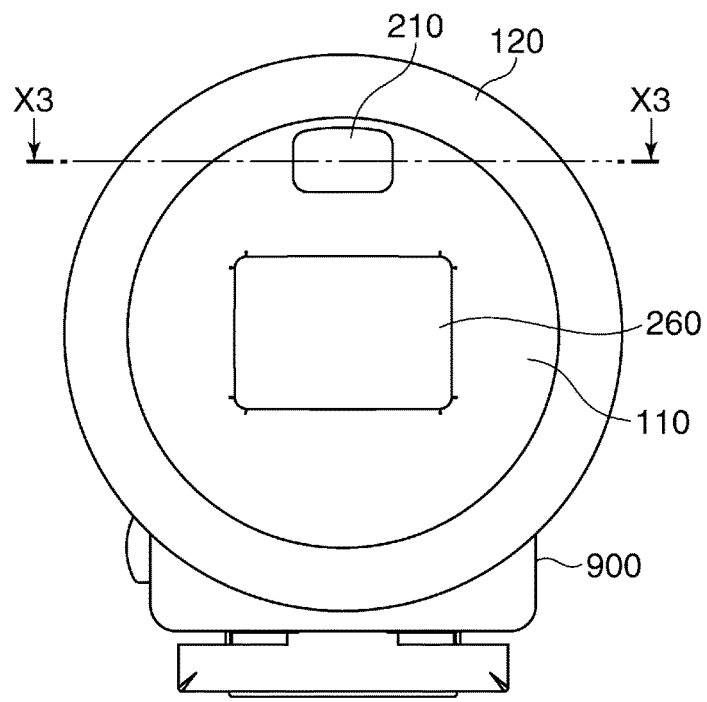
FIG. 8A is a front view showing a configuration after assembling the assembly in FIG. 5 and the eyepiece unit.
Figure 8B:
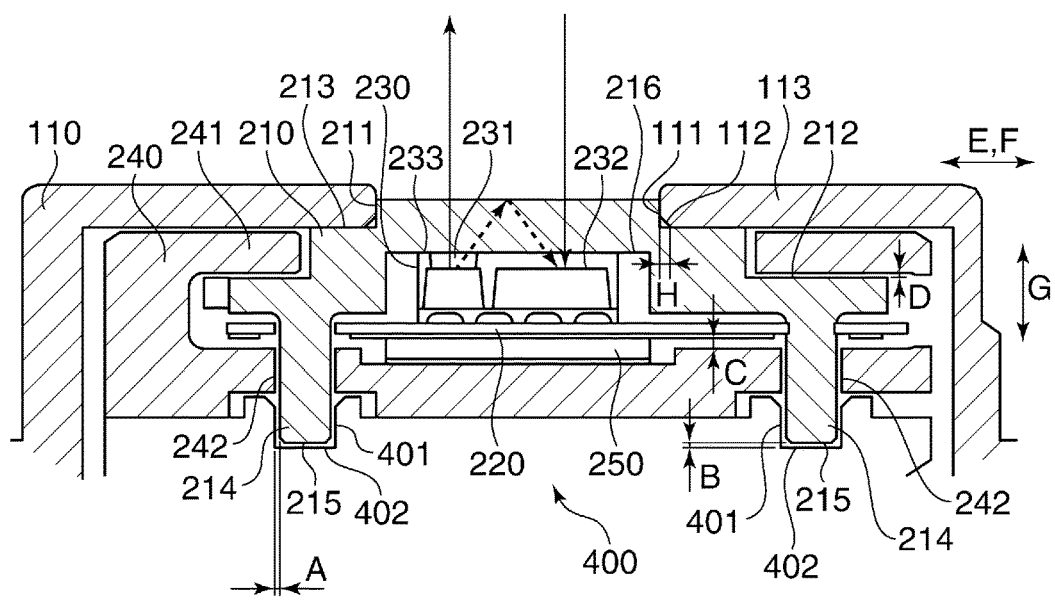
FIG. 8B is a sectional view of the configuration in FIG. 8A taken along the line X3-X3.

Next, the gap between the positioning shaft 214 and the regulation hole 401, the gap between the protection window 210 and the base member 400, the gap between FPC 220 and the cover member 240, the gap between the protection window 210 and the cover member 240, and eye-contact detection with the eye sensor 230 will be described with reference to FIG. 6A through FIG. 8B. FIG. 6A is a front view showing a configuration after assembling the assembly in FIG. 3 and the cover member. FIG. 6B is a sectional view of the configuration in FIG. 6A taken along the line X1-X1. FIG. 7A is a front view showing a configuration after assembling the assembly in FIG. 4 and the base member. FIG. 7B is a sectional view of the configuration in FIG. 7A taken along the line X2-X2. FIG. 8A is a front view showing a configuration after assembling the assembly in FIG. 5 and the eyepiece unit. FIG. 8B is a sectional view of the configuration in FIG. 8A taken along the line X3-X3.

First, as shown in FIG. 8B, the gap between the positioning shaft 214 of the protection window 210 and the regulation hole 401 of the base member 400 in the directions that intersect perpendicularly with the optical axis shall be A. Deviation amounts between the eyepiece cover 110 and the base member 400 in the directions that intersect perpendicularly with the optical axis shall be E and F, respectively. The deviation amount E is a value in the direction parallel to the sheet of FIG. 8B, and the deviation amount F is a value in the direction perpendicular to the sheet. In this case, the gap and the deviation amounts are set so as to satisfy the relationship of the following formula (1).

$$A > E, F \quad (1)$$

When the above-mentioned formula (1) is satisfied, even if the eyepiece cover 110 shifts by the deviation amounts E and F, the fitting part 211 of the protection window 210 and the opening 111 of the eyepiece cover 110 are relatively movable to the position where the fitting part 211 is fitted to the opening 111 because the gap A is larger than the deviation amounts E and F. Accordingly, the protection window 210 becomes incorporable, and the protection window 210 is exposed to external appearance in the incorporated state.

Moreover, the gap between a contact surface 215 of the protection window 210 and a contact surface 402 of the base member 400 in the optical axis direction shall be B, and the gap between the FPC 220 and the cover member 240 in the optical axis direction shall be C. Furthermore, the gap between the first contact part 212 of the protection window 210 and the contact part 241 of the cover member 240 in the optical axis direction shall be D, and deviation amount of the contact part 113 of the eyepiece cover 110 and the base member 400 in the optical axis direction shall be G. In this case, the gaps and the deviation amount are set so as to satisfy the relationship of the following formula (2).

$$B, C, D > G \quad (2)$$

When the above-mentioned formula (2) is satisfied, the following effect is obtained when the protection window 210 is incorporated while pushing the second contact part 213 of the protection window 210 with the contact part 113 of the eyepiece cover 110. That is, the incorporation becomes available without the contact of the protection window 210 with the base member 400 and without the contact of the FPC 220 with the cover member 240 before the contact of the eyepiece cover 110 with the base member 400. On the contrary, it does not occur that the contact part 113 cannot push the second contact part 213 of the protection window 210 even if the eyepiece cover 110 is incorporated in the position to contact the base member 400.

Moreover, the gap C can also be paraphrased as the maximum compression amount of the elastic member 250, and is designed so as to satisfy the relationship of the following formula (3) so that unnecessary external force is not applied to the eye sensor 230 when the external force in the optical axis direction is applied to the protection window 210.

$$C > B \quad (3)$$

When the above-mentioned formula (3) is satisfied, the contact surface 215 of the protection window 210 contacts with the contact surface 402 of the base member 400 before contacting the FPC 220 on which the eye sensor 230 is implemented with the cover member 240 when external force is applied to the protection window 210. This prevents unnecessary external force from applying to the eye sensor 230.

Moreover, when chamfer dimension of a chamfer 112 provided in the opening 111 of the eyepiece cover 110 shall be H, the chamfer dimension H and the gap A are set up so as to satisfy the relationship of the following formula (4).

$$H > A \quad (4)$$

When the above-mentioned formula (4) is satisfied, the fitting part 211 of the protection window 210 falls within the range of the chamfer dimension H of the chamfer 112 even if the protection window 210 is temporarily assembled to the base member 400 with the deviation by the gap A when the eyepiece cover 110 is incorporated. Accordingly, since the protection window 210 follows the chamfer 112, the eyepiece cover 110 is smoothly incorporable.

Next, the eye-contact detection of the eye sensor 230 will be described. As shown in FIG. 6A through FIG. 8B, the eye sensor 230 consists of the infrared light emitting element 231 as a light projecting section and the light receiving element 232 as a light receiving section.

The infrared light (a solid line arrow in FIG. 8B) projected from the infrared light emitting element 231 is reflected by a part of a person's face in the eye-contact state. The eye-contact state is detected by receiving the reflected light (a solid line arrow in FIG. 8B) with the light receiving element 232.

Incidentally, the infrared light projected from the infrared light emitting element 231 is not necessarily reflected only by a person's face actually, and is also reflected by the inner surface of the protection window 210, and may reach the light receiving element 232 as stray light (a broken-line arrow in FIG. 8B). If the amount of the infrared light reflected by the person's face is sufficiently more than the stray light, it will be satisfactory to the detection of the eye-contact state. However, if there is large amount of the stray light, erroneous detection of the eye-contact state may occur even if the eye-contact state is not attained actually.

The deviation between the protection window 210 and the eye sensor 230, and the variations of the gaps are considered as factors that increase the stray light. For example, when the gap between the protection window 210 and the eye sensor 230 in the optical axis direction is large, stray light that is reflected by the contact surface 216 of the protection window 210 against the eye sensor 230 may occur in addition to the stray light of the broken-line arrow in FIG. 8B, which increases the amount of the stray light.

In this embodiment, since the protection window 210 and the eye sensor 230 are positioned directly, the deviation in the optical axis direction is sufficiently reduced. Moreover, since the protection window 210 contacts with the eye sensor 230 by the elastic member 250 in the optical axis direction, the gap between the protection window 210 and the eye sensor 230 is kept by 0, which reduces generation of the stray light and prevents erroneous detection of the eye-contact state.

As described above, this embodiment prevents the erroneous detection of the eye sensor 230 without increasing the number of elements, and provides the electronic view finder 10 that improves the appearance without increasing stray light.

It should be noted that the present invention is not limited to what has been described with the above-mentioned embodiment, quality of the material, a shape, a size, a formation, the number of elements, arrangement locations, etc., can be changed suitably unless it is deviated from the scope of the present invention.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-242105, filed Dec. 14, 2016, which is hereby incorporated by reference herein in its entirety.

What is claimed is:

1. An electronic apparatus equipped with an eye sensor holding structure, the electronic apparatus comprising:
a circuit board on which an eye sensor that detects an eye-contact state is implemented;
a protection window that is provided so as to cover a front of the eye sensor and that is held in a state where said circuit board is positioned thereto;
an exterior member to which said protection window is fitted and positioned and that comprises an opening through which said protection window is exposed to external appearance; and
an elastic member that generates energization force for pushing the eye sensor so as to be contact with said protection window and for pushing said protection window so as to be contact with said exterior member.

2. The electronic apparatus equipped with the eye sensor holding structure according to claim 1, wherein said circuit board is positioned and held to said protection window by fitting convex parts provided in said protection window into holes provided in said circuit board.

3. The electronic apparatus equipped with the eye sensor holding structure according to claim 1, further comprising:
a base member that holds said protection window with a predetermined gap in an optical axis direction and a direction that intersects perpendicularly with the optical axis so as to be relatively movable; and
a cover member that regulates a position of said protection window in the optical axis direction.

4. The electronic apparatus equipped with the eye sensor holding structure according to claim 3, wherein the predetermined gap in the direction that intersects perpendicularly with the optical axis is larger than a deviation amount between said base member and said exterior member in the direction that intersects perpendicularly with the optical axis.

5. The electronic apparatus equipped with the eye sensor holding structure according to claim 3, wherein the predetermined gap in the optical axis direction is smaller than a maximum compression amount of said elastic member in the optical axis direction.

6. The electronic apparatus equipped with the eye sensor holding structure according to claim 3, wherein a chamfer with chamfer dimension that is larger than the predetermined gap in the direction that intersects perpendicularly with the optical axis is provided in an inner periphery of the opening of said exterior member.

7. The electronic apparatus equipped with the eye sensor holding structure according to claim 3, wherein said protection window in which the eye sensor and said circuit board are incorporated is incorporated in said cover member, said cover member in which said protection window is incorporated is incorporated in said base member, and said exterior member is incorporated in said base member in which said cover member is incorporated.

8. The electronic apparatus equipped with the eye sensor holding structure according to claim 1, wherein said circuit board is a flexible printed circuit board.

9. An image pickup apparatus comprising:
an electronic view finder;
an eye sensor that detects an eye-contact state to said electronic view finder;
a circuit board on which said eye sensor is implemented;
a protection window that is provided so as to cover a front of said eye sensor and that is held in a state where said circuit board is positioned thereto;
an exterior member to which said protection window is fitted and positioned and that comprises an opening through which said protection window is exposed to external appearance; and an elastic member that generates energization force for pushing said eye sensor so as to be contact with said protection window and for pushing said protection window so as to be contact with said exterior member.

* * * * *